US012030338B2

(12) United States Patent
Wagner et al.

(10) Patent No.: US 12,030,338 B2
(45) Date of Patent: Jul. 9, 2024

(54) FOUNTAIN PEN WITH QUICK-FILLING COUPLING

(71) Applicant: Montblanc-Simplo GmbH, Hamburg (DE)

(72) Inventors: Thilo Wagner, Hamburg (DE); Tim Ole Meikert, Hamburg (DE)

(73) Assignee: Montblanc-Simplo GmbH (DE)

( * ) Notice: Subject to any disclaimer, the term of this patent is extended or adjusted under 35 U.S.C. 154(b) by 0 days.

(21) Appl. No.: 18/043,365

(22) PCT Filed: Sep. 1, 2021

(86) PCT No.: PCT/EP2021/074136
§ 371 (c)(1),
(2) Date: Feb. 28, 2023

(87) PCT Pub. No.: WO2022/049126
PCT Pub. Date: Mar. 10, 2022

(65) Prior Publication Data

US 2023/0331027 A1 Oct. 19, 2023

(30) Foreign Application Priority Data

Sep. 1, 2020 (DE) ..................... 10 2020 122 970.4

(51) Int. Cl.
*B43K 5/18* (2006.01)
*B43K 5/10* (2006.01)
*B43K 11/00* (2006.01)

(52) U.S. Cl.
CPC .................. *B43K 5/18* (2013.01); *B43K 5/10* (2013.01); *B43K 11/00* (2013.01); *B43K 5/1827* (2013.01); *B43K 5/1863* (2013.01)

(58) Field of Classification Search
CPC . B43K 5/18; B43K 5/10; B43K 11/00; B43K 5/1818; B43K 5/1827; B43K 5/1863; B43K 11/005
(Continued)

(56) References Cited

U.S. PATENT DOCUMENTS 2,142,533 A 1/1939 Stenersen
2,737,329 A * 3/1956 Bolsey .................. B43K 11/00 401/242
(Continued)

FOREIGN PATENT DOCUMENTS

DE 1039407 B 9/1958
DE 4409756 A1 9/1995
(Continued)

*Primary Examiner* — David J Walczak
(74) *Attorney, Agent, or Firm* — Lorenz & Kopf LLP

(57) ABSTRACT

A fountain pen with a quick-filling coupling includes a nib assembly, a housing with a main tank and a writing tank formed therein, a rotatable finial at an end of the fountain pen opposite from the nib assembly, and a coupling for placing the housing on an ink feed device. A first sealing unit, arranged between the writing tank and the main tank, can be selectively opened and closed for filling the writing tank via the main tank. A second sealing unit, arranged between the writing tank and the nib assembly, can be selectively opened and closed for supplying ink to the nib assembly. A third sealing unit, arranged between the main tank and the coupling, can be opened and closed for filling at least the main tank. The finial is operably coupled to the pen for controlling the opening state of the first and second sealing units.

14 Claims, 6 Drawing Sheets

(58) Field of Classification Search
USPC .................................. 401/222, 230, 232, 249
See application file for complete search history.

(56) References Cited

U.S. PATENT DOCUMENTS

| | | | | |
|---|---|---|---|---|
| 2,938,499 | A * | 5/1960 | Lindenbaum .......... | B43K 11/00 141/20.5 |
| 5,888,008 | A | 3/1999 | Obersteller et al. | |

FOREIGN PATENT DOCUMENTS

| | | | |
|---|---|---|---|
| FR | 361427 | A | 6/1906 |
| FR | 948351 | A | 7/1949 |
| JP | 2001347786 | A | 12/2001 |

* cited by examiner

FOUNTAIN PEN WITH QUICK-FILLING COUPLING

CROSS-REFERENCE TO RELATED APPLICATIONS

This application is a National Stage of International Application No. PCT/EP2021/074136, filed Sep. 1, 2021, which claims the benefit and priority of DE 10 2020 122 970.4, filed Sep. 2, 2020. The entire disclosures of each of the above applications are incorporated by reference herein.

TECHNICAL FIELD

The invention relates to a fountain pen with a quick-filling coupling and a writing instrument system comprising a fountain pen and an ink feed device.

BACKGROUND

High-quality writing instruments with a nib assembly often have a piston tank that can be filled by immersing the nib assembly into an ink reservoir and rotating a finial arranged opposite the nib assembly. It is expedient to clean the nib assembly after a filling process. When using such a fountain pen, for example, in a commercial aircraft where the pressure at cruising altitude is significantly lower than on the ground, ink may sometimes leak from the nib assembly due to the reduced pressure acting on the piston tank.

SUMMARY

It is a task of the invention to propose a fountain pen which at least partially eliminates the above-mentioned disadvantages. At the same time, the fountain pen should be as easy to use as possible.

This task is solved by a fountain pen with the features of independent claim 1. Advantageous embodiments and further developments can be found in the subclaims and the following description.

A fountain pen with a quick-filling coupling is proposed, comprising a nib assembly, a housing with a main tank and a writing tank formed therein, a rotatable finial at an end of the fountain pen opposite from the nib assembly, and a coupling for placing the housing on an ink feed device, wherein a first sealing unit is arranged between the writing tank and the main tank, which first sealing unit can be selectively opened and closed for filling the writing tank via the main tank, wherein a second sealing unit is arranged between the writing tank and the nib assembly, which second sealing unit can be selectively opened and closed for supplying ink to the nib assembly, wherein a third sealing unit is arranged between the main tank and the coupling, which third sealing unit can be opened and closed for filling at least the main tank, and wherein the finial is coupled to mechanics which are configured to control the opening state of at least the first sealing unit and the second sealing unit.

The nib assembly is to be understood as a unit comprising a nib and an ink feed. The nib is slipped onto or plugged onto the ink feed and is in fluid connection with ink in conductive capillaries of the ink feed.

The housing provides the substantial outer form of the writing instrument and is sometimes also referred to as the reservoir. The housing or reservoir is gripped by a user during writing. A peculiarity of the fountain pen according to the invention is the division of a tank into a main tank and a writing tank. The writing tank could, for example, be brought directly into fluid connection with the nib assembly and provide ink to it.

The size of the writing tank can be significantly reduced compared to the usual size of a piston tank. The writing tank is then only used for the temporary feed of ink to the nib assembly. The effects of low pressure on the significantly smaller volume of the writing tank compared to conventional piston tanks can therefore be significantly limited. By selectively establishing a fluid connection with the main tank, the writing tank can be directly refilled inside the fountain pen, should it be emptied.

The finial is flush with the housing and preferably has a surface shape that is tangentially constant to the housing. The user can grip the housing and perform the above functions by turning the finial.

The fountain pen according to the invention is thus configured to establish a writing state by closing the first and third sealing units and opening the second sealing unit. By opening the first sealing unit, closing the second sealing unit and closing the third sealing unit, the writing tank can be refilled with ink from the main tank. In so doing, the fountain pen should be slightly tilted so that the writing tip points downwards. By opening the first and third sealing units as well as closing the second sealing unit, ink can be fed into the main tank and the writing tank via the coupling. Accordingly, the fountain pen is not filled via the nib assembly, but rather via the coupling. A certain sequence of opening and closing of the sealing units can be provided for the above-mentioned filling processes in order to prevent that a possible pressure difference leads to ink leakage.

A type of filling system that feeds ink from a separate reservoir can be used as ink feed device. This can be carried out mechanically or electrically. The ink feed device may comprise an air channel and an ink channel, each of which is configured as a small tube. The air channel may be positioned within the ink channel in a concentric arrangement. It may be expedient to release a certain amount of air through the air channel to flush out the ink in the tanks, thereby completely emptying the fountain pen. By subsequent suctioning of air out of the air channel, ink can be drawn in via the ink channel, which ink then flows out of the reservoir into the tanks. In so doing, it is preferable to adjust the air volume or alternatively the ink volume to the specific fountain pen in order to achieve complete filling of the tanks. In so doing, the fountain pen should be oriented so that the writing tip points upwards. When using such a filling system, remaining ink found in the fountain pen can initially be transferred to the reservoir before the fountain pen is filled with ink.

It is particularly preferred if the writing tank is arranged between the nib assembly and the main tank. The writing tank is thus arranged directly or almost directly on the nib assembly. There is then only the second sealing unit between the nib assembly and the writing tank, which second sealing unit is opened to feed the nib assembly with ink or for cleaning and closed for refilling the writing tank.

It is advantageous if the finial is removable and covers the coupling when it is arranged on the housing. The coupling is therefore only visible and usable when the finial is removed. This not only improves the external appearance of the fountain pen itself, but also protects the coupling from contamination.

The first sealing unit could comprise a sleeve and a complementary-shaped first sealing member, which sealing member can be displaced in a linear manner into the sleeve and out of the sleeve. The first sealing member can thus be brought into the interior of the sleeve and form a radial seal with the sleeve, for example, by means of a circumferential seal ring or the like. The opening of the first sealing unit can be brought about by displacing the first sealing member out of the sleeve. In the opposite direction, the opening can be closed when the first sealing member is displaced into the sleeve. As a consequence, only an axial movement is necessary to produce or open a seal. In order to achieve a particularly simple guidance of the first sealing member in the sleeve, funnel-shaped inlet ends can be provided.

Preferably, the mechanics comprise a longitudinal displacement element which is coupled to the first sealing member and configured to be displaced in a linear manner inside the housing. Accordingly, by a simple displacement of the longitudinal displacement element, the first sealing unit can be operated. By arrangement along a central axis or parallel thereto, operation of the first sealing unit can also be carried out from an end of the housing in which the finial is arranged.

In an advantageous embodiment, the second sealing unit comprises a second sealing member and a sealing surface having a feed-through bore disposed therein, wherein the second sealing member can be pressed in a linear manner onto the sealing surface to cover the feed-through bore. As a consequence, only one feed-through bore could be arranged between the writing tank and the nib assembly, which feed-through bore could be selectively covered by the second sealing member. The second sealing member could consist of an elastic material that can be pressed onto the feed-through bore in the axial direction. In so doing, this can prevent ink from passing from the writing tank to the nib assembly.

Particularly preferably, the first sealing member and the second sealing member are coupled to each other via a spring that applies an axial spring force. This allows the movement of the first sealing member to be coupled with a movement of the second sealing member. If the first sealing member is moved axially in the direction of the nib assembly, a compression spring arranged between the second sealing member and the first sealing member could move the second sealing member in the direction of the feed-through bore. A continued movement of the first sealing member after surface contact of the second sealing member with the sealing surface is then easily possible in order to guide the first sealing member out of the sleeve with a time delay. This merely compresses the spring and forces the second sealing member more firmly onto the feed-through bore. The mechanics are hereby considerably simplified.

In a particularly preferred embodiment, the first sealing unit and the second sealing unit can be brought into a writing setting, a refilling setting, and a cleaning setting relative to one another, wherein in the writing setting the first sealing unit is closed and the second sealing unit is open, wherein in the refilling setting the first sealing unit is open and the second sealing unit is closed, and wherein in the cleaning setting the first sealing unit and the second sealing unit are simultaneously open. The writing setting and the refilling setting are preferably achieved by rotating the finial to a specific setting. The cleaning setting is a position in which the fountain pen is configured to perform a flushing of the entire fountain pen with a cleaning liquid. The fountain pen can be placed with its coupling on a cleaning device, which then runs a rinsing liquid through. This cleaning setting should preferably not be directly adjustable with the finial, but in particular via a concealed release after removal of the finial or the like, for example, via an implement suitable for this purpose.

In an equally advantageous embodiment, the longitudinal displacement element is coupled to a curved sleeve which is rotatable by the finial and thereby carries out a linear displacement of the longitudinal displacement element. The longitudinal displacement is accordingly performed by a curved sleeve having a curve which moves a cam or the like. By rotating the finial, the curved sleeve can be rotated so that the cam located therein moves in the axial direction. A longitudinal guidance of the curved sleeve is expedient here to prevent a twisting of the body driven by the cam.

In an advantageous embodiment, the third sealing unit comprises at least one seal made of a rubber-elastic material with a feed-through extending therein. The third sealing unit could, for example, be penetrated by small tubes that conduct ink and/or air. The rubber-elastic material may be an elastomer or a material which at least at room temperature has the properties of an elastomer.

It is advantageous if the third sealing unit has two seals spaced longitudinally apart from one another, each with a feed-through having diameters that decrease in the direction away from the coupling, wherein the feed-through of a first seal closer to the coupling can be brought into fluid connection with the main tank and a second seal that is more remote from the coupling can be brought into fluid connection with the writing tank. This allows two coaxial lines of different lengths to come into contact with both seals. Whereas a first seal allows a transfer of air, a second seal could be provided for a transfer of ink.

The longitudinal displacement element is preferably hollow and the fluid connection of the writing tank can be obtained with the second feed-through. Accordingly, the longitudinal displacement element could conduct air or, depending on the configuration, ink. The limited installation space within the fountain pen can thus be well utilized by the dual function.

The finial is, moreover, preferably removable by means of a bayonet fixture. This fixture is smooth-running and robust, so that it can also be operated repeatedly. The bayonet fixture allows for an easy attachment and an easy detachment.

The invention further relates to a writing instrument system, comprising a fountain pen and an ink feed device, comprising an air channel and an ink channel separate from the air channel, which channels are guidable through the third sealing unit, wherein the ink feed device is configured to introduce air into the air channel and to suction off air from the air channel, wherein the ink channel can be fluidly connected to an ink reservoir.

BRIEF DESCRIPTION OF THE FIGURES

Further features, advantages and possible applications of the present invention will be apparent from the following description of the embodiment examples and the figures. In this context, all the features described and/or illustrated constitute, in themselves and in any combination, the subject-matter of the invention, regardless of their composition in the individual claims or their references. Moreover, the same reference numbers refer to the same or similar objects in the figures.

DETAILED DESCRIPTION

Figure 1:
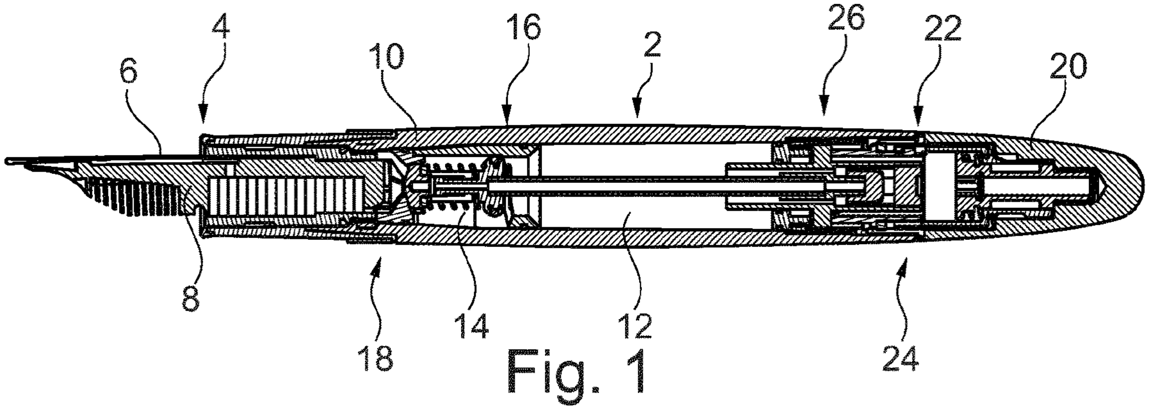
FIG. 1 shows a side cross-section of a fountain pen.

FIG. 1 shows an overall view of the fountain pen 2, whereas individual details are shown in the subsequent figures. The fountain pen 2 comprises a nib assembly 4 with a nib 6 and an ink feed 8 supporting the nib 6. The nib assembly 4 is arranged at a front side of a housing 10.

A main tank 12 and a writing tank 14 are also configured in the housing 10. The writing tank 14 is significantly smaller than the main tank 12 and can be refilled from the main tank. A first sealing unit 16 is arranged between the writing tank 14 and the main tank 12 for this purpose, which sealing unit 16 can selectively establish or interrupt a fluid connection between the main tank 12 and the writing tank 14. The writing tank 14 is directly adjacent to the nib assembly, wherein a second sealing unit 18 is arranged between the writing tank 14 and the nib assembly 4. This second sealing unit 18 can selectively establish fluid connection between the writing tank 14 and the nib assembly 4.

Figure 12:
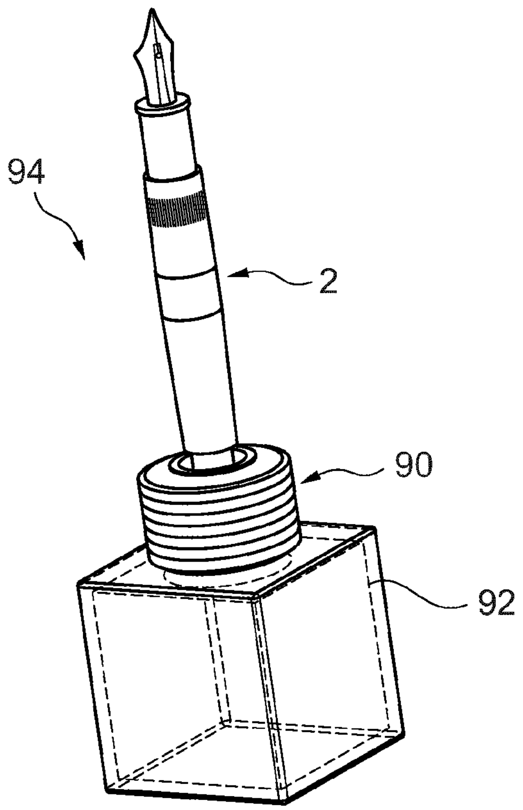
FIG. 12 shows a fountain pen with an ink feed device and an ink reservoir.

A rotatable finial 20 is arranged at a rear end of the housing 10. This finial 20 can be removed from the housing 10. A coupling 22 is moreover found there, with which coupling the fountain pen 2 can be attached to an ink feed device 90 (FIG. 12). A third sealing unit 24 is arranged between the coupling 22 and the main tank 12, which sealing unit 24 can be selectively opened and closed for filling the main tank 12. The finial 20 is thereby coupled to mechanics 26, which are configured to control an opening state in at least the first sealing unit 16 and the second sealing unit 18. The fountain pen 2 can thus be brought into a writing state by rotating the finial 20, or into a state for filling of the writing tank 14 by the main tank 12.

Figure 2:
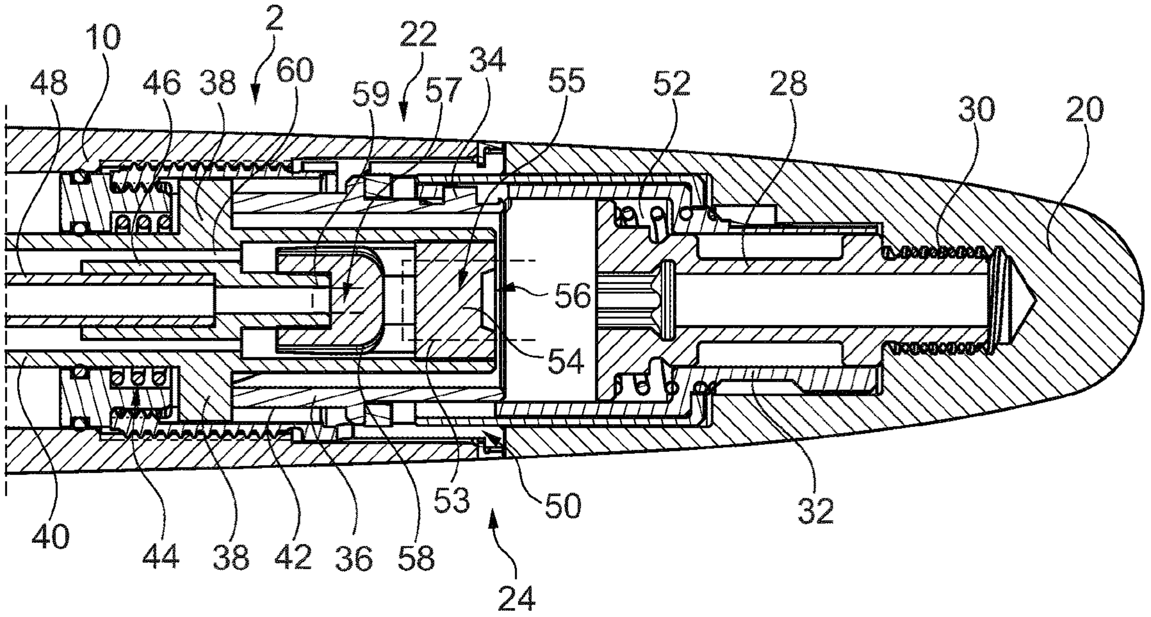
FIG. 2 to FIG. 4 show different detail views of the side cross-section of the fountain pen.

FIG. 2 shows a rear part of the fountain pen 2. Here, the finial 20 comprises a finial screw 28, which is screwed together with the finial 20 via an assembly thread 30. A bayonet sleeve 32, which is non-rotatably connected to the finial 20, engages in a cam 34 of a curved sleeve 36. This curved sleeve 36 is in surface contact with wings 38 of a tank bushing 40, wherein the wings 38 are guided in grooves 42 arranged radially on the outside such that the tank bushing 40 is exclusively moved in a linear manner. A compression spring 44 is arranged on one side of the wing 38 facing away from the curved sleeve 36, which compression spring presses the wing 38 and thus the tank bushing 40 in the direction of the finial 20. The bayonet sleeve 32 thus rotates upon rotation of the finial 20, which bayonet sleeve 32 is connected to the curved sleeve 36 via cam 34 and thereby transmits the rotational movement. This causes the tank bushing 40 to move axially, thereby displacing a longitudinal displacement element 48.

The coupling 22 could, by way of example, have a gap 50 between the tank bushing 40 and the curved sleeve 36, via which the fountain pen 2 can be plugged onto an ink feed device 90 (FIG. 12). By rotating the finial 20 in a predetermined direction, the bayonet sleeve 32 can be released from the cam 34 so that the finial 20 with the finial screw 28 and the bayonet sleeve 32 can be completely removed from the fountain pen 2. If the finial 20 is once again fastened with the bayonet sleeve 32, a tension spring 52 is pulled slightly to the left in the plane of the drawing so that a certain holding force is exerted on the bayonet sleeve 32 or alternatively the cam 34. This preload can provide good haptic feedback to the user about the bayonet connection snapping into place.

The third sealing unit 24 comprises a first seal 54 formed of a rubber-elastic material and which allows the insertion of a tube into an insertion opening 56. This tube, by way of example, an ink channel 53 (broken lines), could extend through the entire first seal 54 through a feed-through 55 and, end at a side of the first seal 54 facing away from the insertion opening 56. This is followed by a second seal 58, which allows the feeding through of a tube with a smaller diameter, by way of example, an air channel 59 (broken lines), through a feed-through 57, which extends completely through the second seal 58 and ends on a side of the second seal 58 facing away from the first seal 54. The first seal 54 allows a feeding through of a tube which feeds ink. The ink can end up in the space between the two seals 54 and 58 and flow through an axially adjacent annular gap 60 toward the main tank 12. Nevertheless, the longitudinal displacement element 48 is configured to be hollow and is then in fluid connection with the thinner tube 59 that penetrates the second seal 58. As explained in more detail later, this serves for the transfer of, in particular, air.

Figure 3:
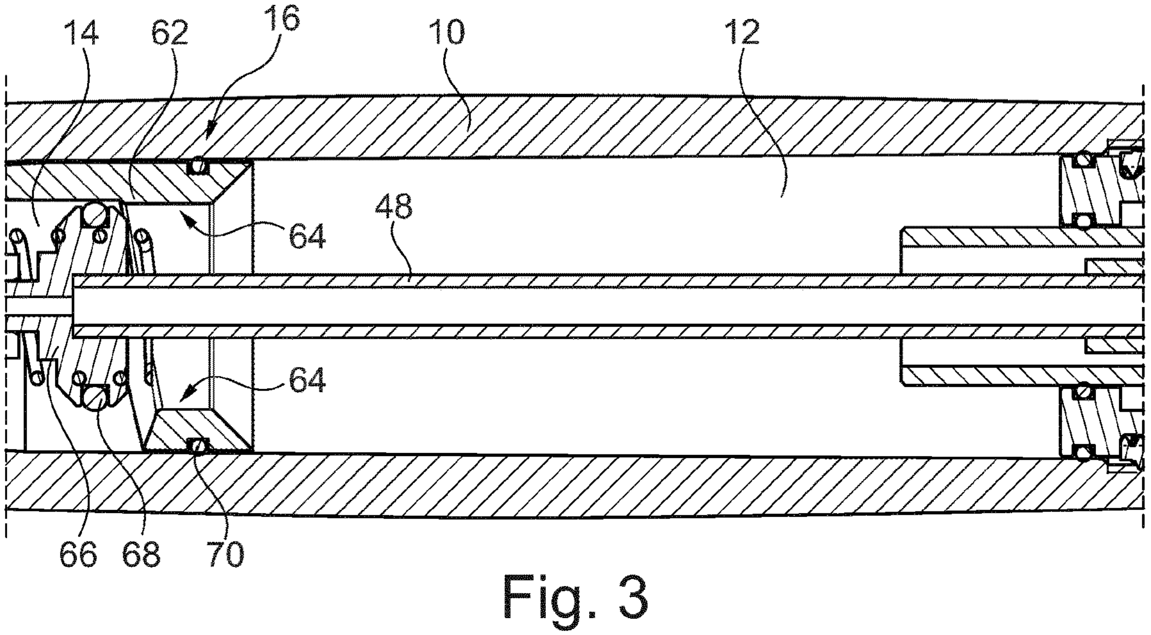

FIG. 3 shows a central section of the fountain pen 2 and in particular the main tank 12. Here, the longitudinal displacement element 48 extends through and along the longitudinal axis of the fountain pen 2. Here, in the plane of the drawing, the first sealing unit 16 can be seen on the left side. This sealing unit 16 has a sleeve 62 which has an inner wall 64. A first sealing member 66 can slide in the inner wall 64, which bears a seal ring 68 on its outer circumference. When the sealing ring 68 is completely inside the inner wall 64, fluid connection between the main tank 12 and the writing tank 14 is prevented. Since the sealing member 66 is connected to the longitudinal displacement element 48, the first sealing unit 16 can be opened or alternatively closed by moving the displacement element 48. For the sake of completeness, reference is made to an additional sealing ring 70 that seals the sleeve 62 at its outer surface to the housing 10.

Figure 4:
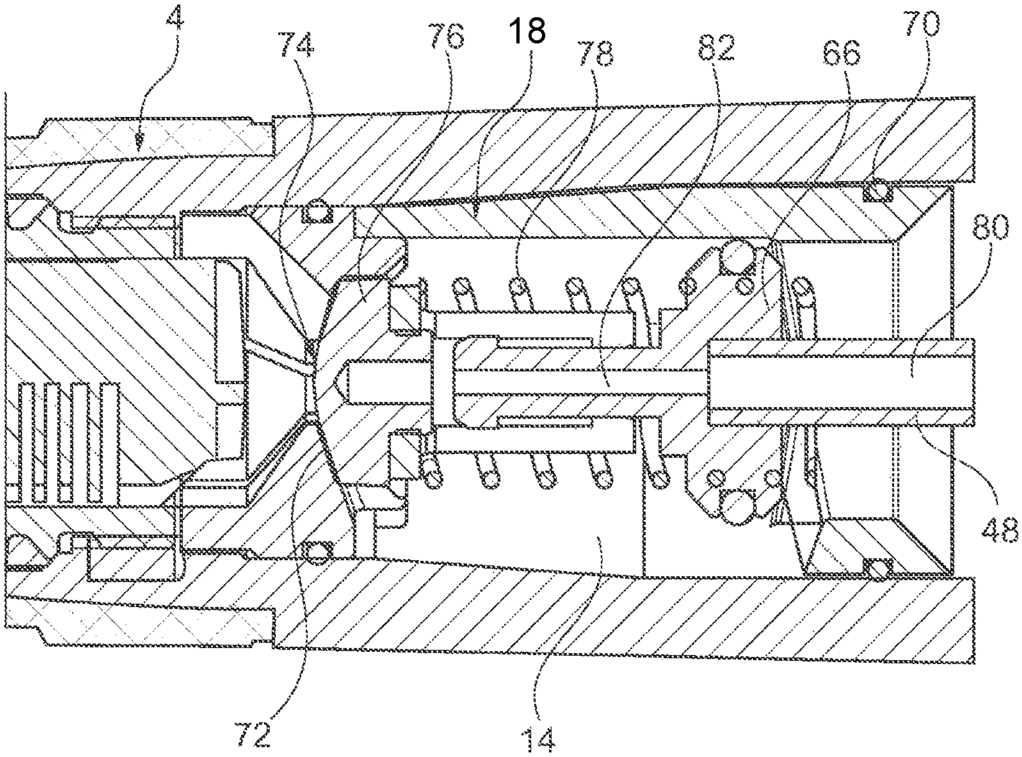

FIG. 4 shows a section facing the nib assembly 4. The second sealing unit 18 can be seen here, which sealing unit 18 has a sealing surface 72 with a feed-through bore 74 arranged therein. A second sealing member 76, which is, for example, made of a rubber-elastic material, can be pressed onto the sealing surface 72 by an axial displacement. The feed-through bore 74 can hereby be closed and consequently prevent fluid connection between the writing tank 14 and the nib assembly 4. The second sealing member 76 is articulated by means of a spring 78, which is connected to the first sealing member 66. A cavity 80 of the longitudinal displacement element 48 is connected with a flow channel 82 of the first sealing member 66, such that, in particular, air makes its way from the cavity 80 through the spring 78 into the writing tank 14.

With the finial 20 removed, the fountain pen 2 can be placed with the coupling 22 on an ink feed device 90 (FIG. 12). In so doing, an air channel 59 can be connected to the second seal 58, and an ink channel 53 (FIG. 2) can be connected to the first seal 54. The air channel 59 (FIG. 2) can direct air through the cavity 80 into the writing tank 14, such that ink found therein is discharged through the opened first sealing unit 16 into the main tank 12 and from there via the annular gap 60 and the ink channel 53. Subsequently, by suctioning out air from the cavity 80, ink can be drawn in via the ink channel 53, which is to say, the first seal 54, such that it flows through the main tank 12 and the writing tank 14 to the flow channel 82, and thereby fills both tank 12 and tank 14.

Figure 5:
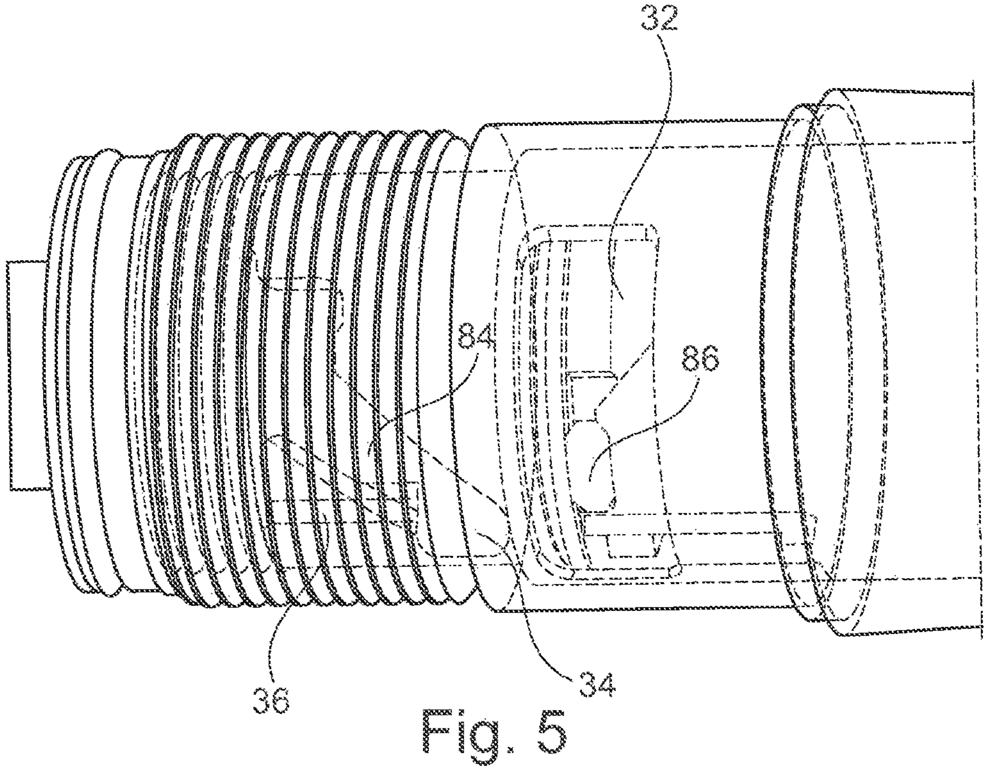
FIG. 5 to FIG. 11 show different details of the fountain pen in different states.

For writing with the fountain pen 2, the first sealing unit 16 is closed and the second sealing unit 18 is opened. This can occur by rotating the finial 20 to a specific rotational position. In FIG. 5, the cam 34 and bayonet sleeve 32 are here shown in a three-dimensional view. The curved sleeve 36 can be seen, in which the curved sleeve cam 34 is introduced in a control curve 84 in a retracted position. As a consequence, the first sealing member 66 and the second sealing member 76 are facing away from the nib assembly 4. The bayonet sleeve 32 is engaged with a bayonet 86 and the finial 20 is fixedly arranged on the fountain pen 2.

Figure 6:
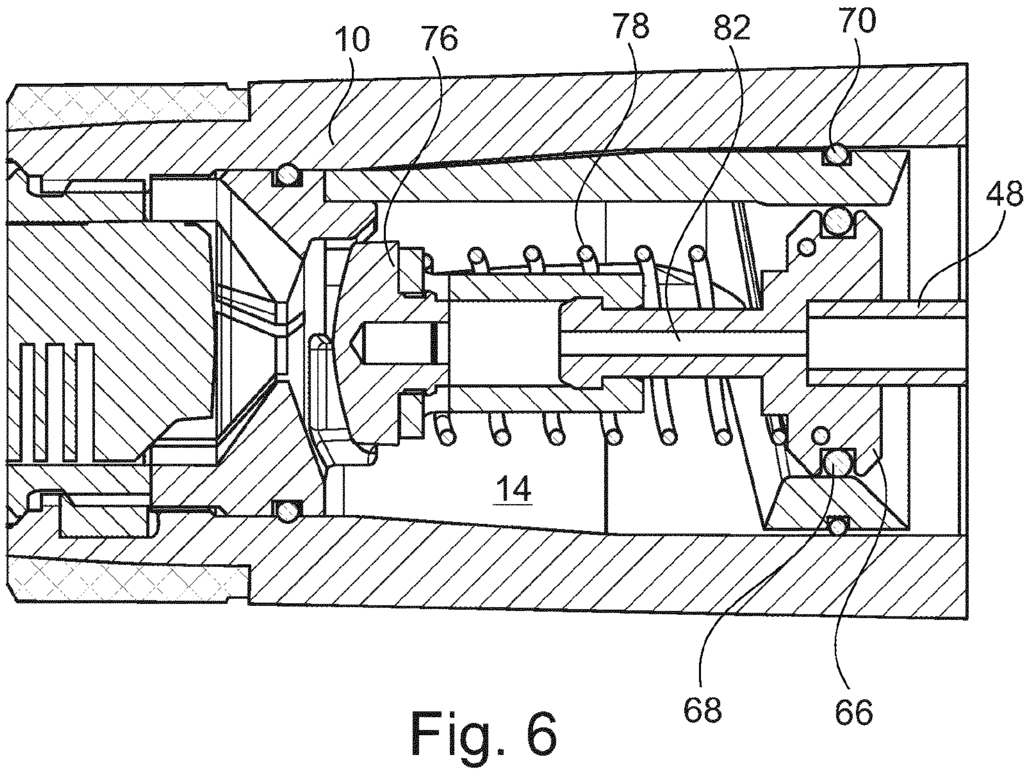
Figure 7:
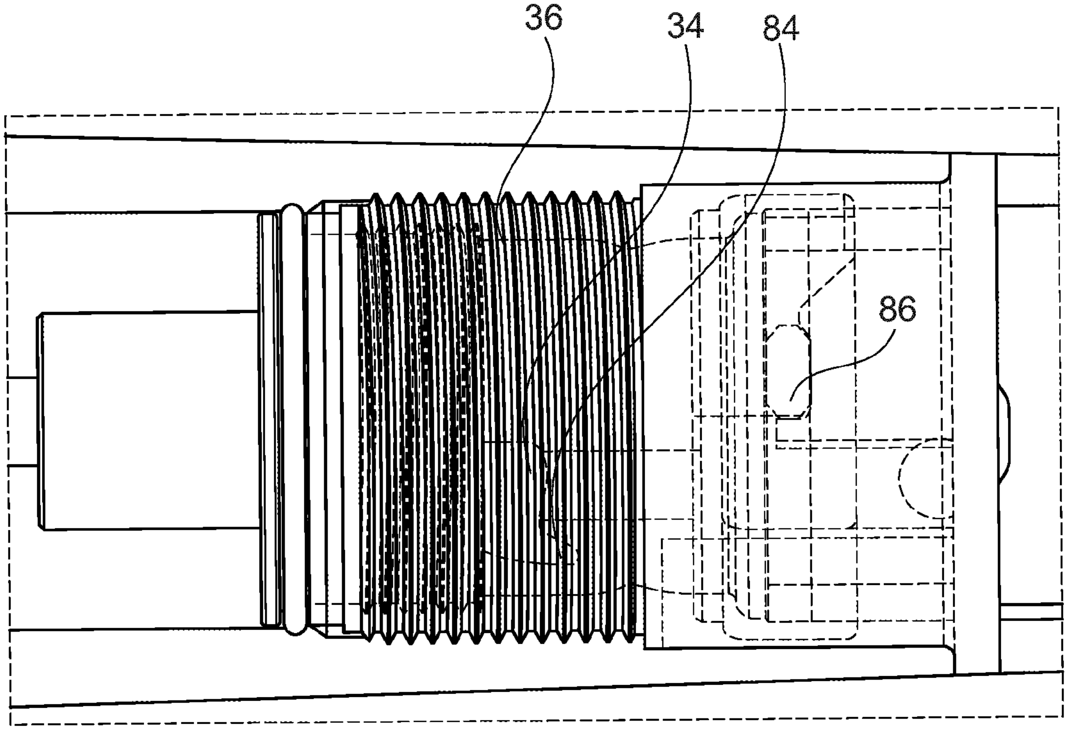
Figure 8:
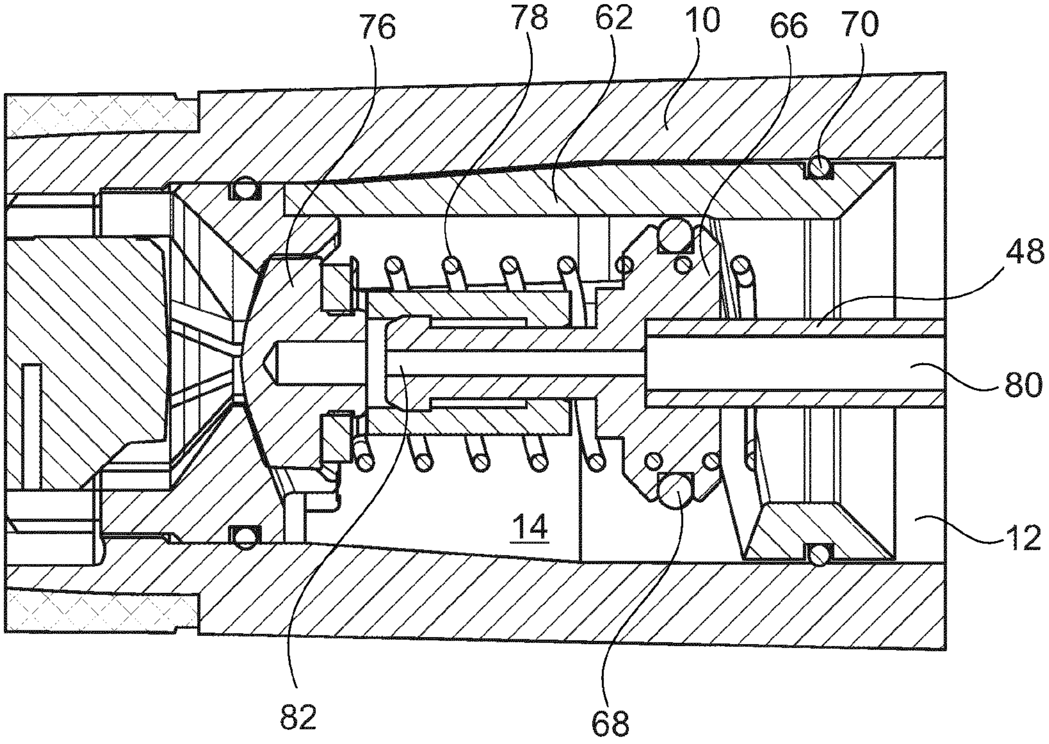

FIG. 6 shows the position of the two sealing members 66 and 76, as explained above. The refilling of the writing tank 14 with ink from the main tank 12 can take place by the closing of the second sealing unit 18 and the opening of the first sealing unit 16. This means that both sealing members 66 and 76 must be moved to the left in the plane of the drawing. This is made clear by the cam 34 shown in FIG. 7, which is shifted to the left in the control curve 84. As a consequence, as shown in FIG. 8, overflow of ink from the main tank 12 into the writing tank 14 is possible.

Figure 9:
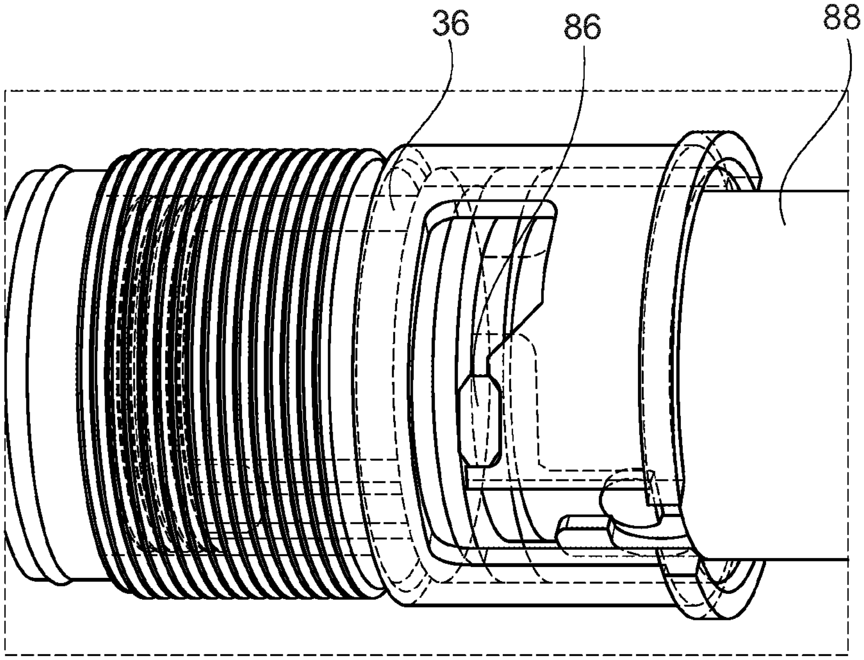
Figure 10:
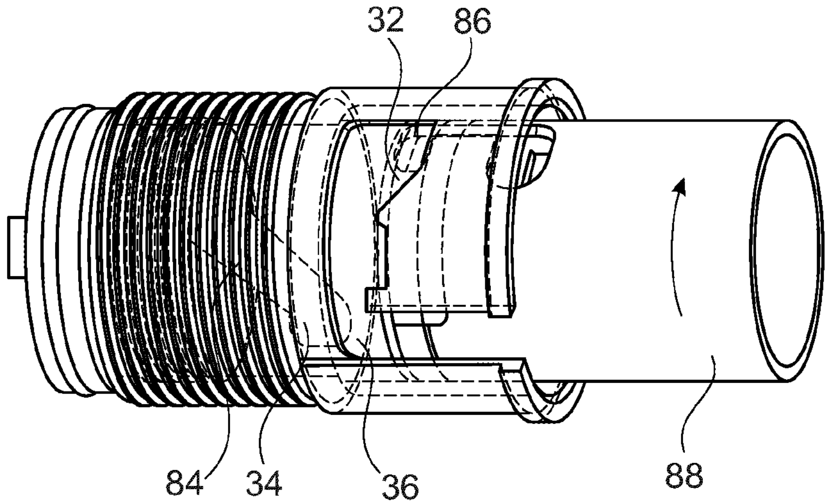
Figure 11:
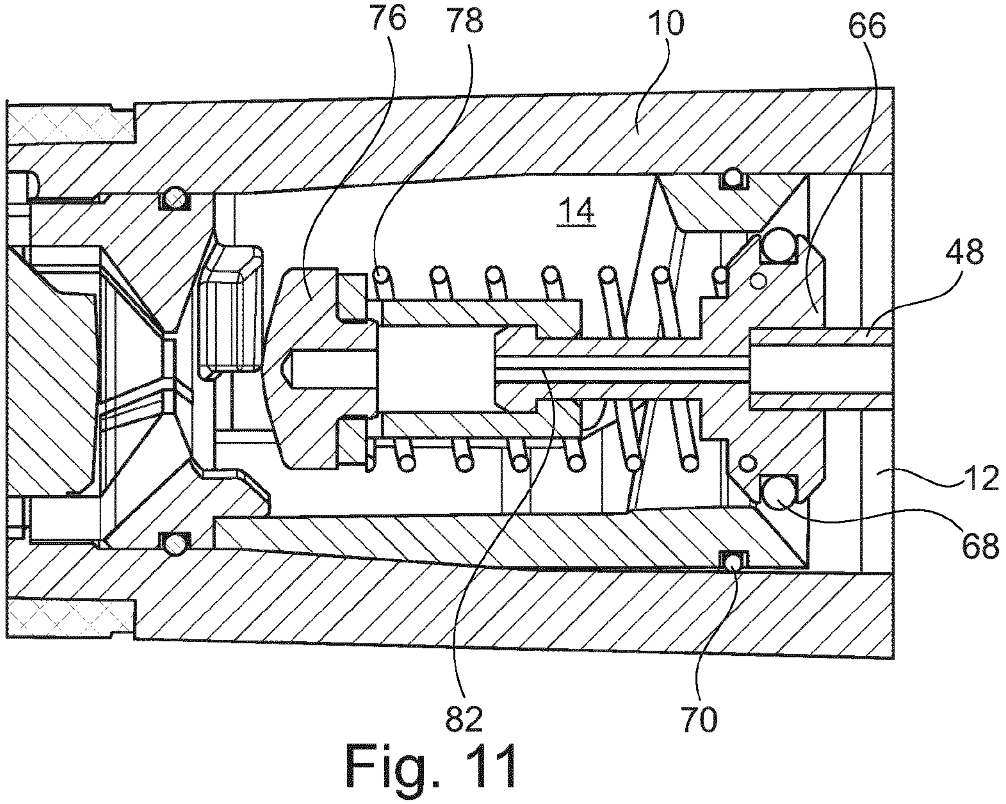

The bayonet sleeve 32 may be configured by a stop or other type of lock-out to be rotated only between the writing position and refilling position, at which both sealing units 16 and 18 are only opened alternately. It is preferred to close both sealing units 16 and 18 in intermediate positions by rotating the finial 20, such that it is ensured that only one of the two sealing units 16 and 18 can be open at a time. A cleaning setting in which both sealing units 16 and 18 are opened simultaneously can therefore not be set with the finial 20. For cleaning the fountain pen 2, an implement 88 can, however, be fitted to the curved sleeve 36 after removing the finial 20, this in order to move it in another direction. This is shown in FIG. 9 and FIG. 10. Using the implement 88 moves the sealing members 66 and 76 to a position in which they are open as shown in FIG. 11. For this purpose, both sealing members 66 are moved in the direction of the finial 20 such that the first sealing member 66 exits on the side of the sleeve 62 facing away from the nib assembly 4. This creates a fluid connection that extends completely through the fountain pen 2. By introducing a cleaning fluid, for example, through the first seal 54, the fountain pen 2 can be flushed.

Lastly, FIG. 12 shows an ink feed device 90 on an ink reservoir 92, wherein the fountain pen 2 is placed on the ink feed device 90. This is configured in such a way that by pressing on the ink feed device 90, the fountain pen 2 initially conducts air through an air channel 595 (FIG. 2) and then suctions out air through the air channel 59 so that ink flows from an ink channel 53 (FIG. 2) connected to the ink reservoir 92, as described above. The arrangement shown forms a writing instrument system 94.

In addition, it should be noted that "comprising" does not exclude other elements or steps, and "a" or "one" does not exclude a plurality. It should further be noted that features described with reference to any of the above embodiments may also be used in combination with other features of other embodiments described above. Reference numbers in the claims are not to be regarded as a limitation.

The invention claimed is:

1. A fountain pen comprising:
- a housing with a main tank and a writing tank formed therein;
- a nib assembly disposed on a first end of the housing;
- a rotatable finial disposed on a second end of the housing opposite from the first end;
- a coupling configured to couple the housing with an ink feed device;
- a first sealing unit arranged between the writing tank and the main tank to provide fluid communication therebetween, wherein the first sealing unit is operable to open and close for selectively filling the writing tank via the main tank;
- a second sealing unit arranged between the writing tank and the nib assembly to provide fluid communication therebetween, wherein the second sealing unit is operable to open and close for selectively supplying ink from the writing tank to the nib assembly; and
- a third sealing unit arranged between the main tank and the coupling for providing fluid communication therebetween, wherein the third sealing unit is operable to open and close for selectively filling the main tank when coupled to the ink feed device, and
- wherein the finial is operably coupled to the first and second sealing units for controlling the opening and closing thereof.

2. The fountain pen according to claim 1, wherein the writing tank is arranged between the nib assembly and the main tank along a longitudinal axis of the fountain pen.

3. The fountain pen according to claim 2, wherein the finial is removable and covers the coupling when disposed on the second end of the housing.

4. The fountain pen according to claim 2, wherein the first sealing unit comprises a sleeve and a first sealing member linearly displaceable into and out of the sleeve.

5. The fountain pen according to claim 4, further comprising a longitudinal displacement element operably coupling the finial to the first sealing member, wherein the longitudinal displacement element is positionable in a linear manner inside the housing.

6. The fountain pen according to claim 5, wherein the longitudinal displacement element is coupled to a curved sleeve which is rotatable by the finial for positioning the longitudinal displacement element inside the housing.

7. The fountain pen according claim 2, wherein the second sealing unit comprises a second sealing member and a sealing surface having a feed-through bore disposed therein, wherein the second sealing member is positionable in a linear manner onto the sealing surface to cover the feed-through bore.

8. The fountain pen according to claim 7, wherein the first sealing unit includes a sleeve and a first sealing member is linearly displaceable into and out of the sleeve, and further comprising a spring coupling the first sealing member and the second sealing member and applying an axial spring force therebetween.

9. The fountain pen according to claim 2, wherein the first sealing unit and the second sealing unit are positionable in the following settings:
- a writing setting with the first sealing unit in a closed state and the second sealing unit in an open state;
- a refilling setting with the first sealing unit in an open state and the second sealing unit in a closed state; and
- a cleaning setting with the first sealing unit and the second sealing unit simultaneously in an open state.

10. The fountain pen according to claim 2, wherein the third sealing unit comprises at least one seal of a rubber-elastic material with a feed-through extending therein.

11. The fountain pen according to claim 2, wherein the third sealing unit comprises:
- a first seal positionable for sealing the main tank, the first seal having a first feed-through with a first diameter extending therein; and
- a second seal longitudinally spaced apart from the first seal in the longitudinal direction toward the nib assembly and positionable for sealing the writing tank, the second seal having a second feed-through with a second diameter extending therein, wherein the first diameter is greater than the second diameter.

12. The fountain pen according to claim 11, further comprising a hollow longitudinal displacement element operably coupling the finial to the first sealing member and positionable in a linear manner inside the housing, wherein a fluid connection of the writing tank is obtained with the second feed-through.

13. The fountain pen according to claim 1 further comprising a bayonet fixture removably coupling the finial to the housing.

14. A writing instrument system comprising a fountain pen according to claim 1, and an ink feed device having a pair of channels guidable through the third sealing unit for operably coupling the fountain pen to the ink feed device and an ink reservoir, wherein the pair of channels includes an air channel configured to introduce air into the air channel and to suction off air from the air channel and an ink channel configured to be fluidly connected to the ink reservoir.

* * * * *